US009865150B2

(12) United States Patent
Branković et al.

(10) Patent No.: US 9,865,150 B2
(45) Date of Patent: Jan. 9, 2018

(54) MILLIMETRE-WAVE SEAT OCCUPATION RADAR SENSOR

(71) Applicant: NOVELIC D.O.O., Belgrade (RS)

(72) Inventors: Veselin Branković, Belgrade (RS); Dušan Grujić, Belgrade (RS); Pavle Jovanović, Belgrade (RS); Veljko Mihajlović, Belgrade (RS); Milan Savić, Belgrade (RS); Darko Tasovac, Belgrade (RS)

(73) Assignee: NOVELIC D.O.O., Belgrade (RS)

( * ) Notice: Subject to any disclaimer, the term of this patent is extended or adjusted under 35 U.S.C. 154(b) by 0 days.

(21) Appl. No.: 15/303,246

(22) PCT Filed: Apr. 15, 2015

(86) PCT No.: PCT/RS2015/000010
§ 371 (c)(1),
(2) Date: Oct. 11, 2016

(87) PCT Pub. No.: WO2015/160273
PCT Pub. Date: Oct. 22, 2015

(65) Prior Publication Data
US 2017/0039835 A1    Feb. 9, 2017

(30) Foreign Application Priority Data

Apr. 14, 2014    (RS) .................................. 2014/0183

(51) Int. Cl.
*G08B 23/00*      (2006.01)
*G08B 21/06*      (2006.01)
(Continued)

(52) U.S. Cl.
CPC ............. *G08B 21/06* (2013.01); *B60N 2/002* (2013.01); *B60R 21/01534* (2014.10);
(Continued)

(58) Field of Classification Search
CPC .......... B60N 2/002; B60N 2/26; G08B 21/02; G08B 21/18; B60H 1/00742
(Continued)

(56) References Cited

U.S. PATENT DOCUMENTS 6,104,293 A  *  8/2000  Rossi ..................... B60N 2/002
                                                                        340/425.5
6,661,345 B1    12/2003  Bevan
(Continued)

FOREIGN PATENT DOCUMENTS

EP            1 732 441 B1    12/2013

*Primary Examiner* — Phung Nguyen
(74) *Attorney, Agent, or Firm* — Luoh J. Wu; Continent Patent Office LLP

(57) ABSTRACT

The present invention discloses a mm-wave radar sensor to be deployed in the vehicles for seat occupation detection applications. The key system relevant components are utilization of mm-wave integrated radar, specific planar high-gain antenna radiation pattern, and analyzing of the heart-beat and optionally also respiratory dynamics. The method of operation calculates probability of the seat occupation event regarding: detection of the passenger on the seat, detection of a baby or a child on the seat, detection of the presence of a baby or a child in the vehicle after the driver has left the vehicle, detection of the human or animal presence of intrusion in specific vehicle environment. In case that probability is above a predefined threshold, typically the interaction with vehicle control system is initiated using arbitrary automotive interfaces. Corresponding predefined actions are taken in that case. The predefined actions could be one or combination of the following: audio signal alerts to driver, inside cabin light condition change, engine operation condition change, opening of the windows or corresponding communication using arbitrary wireless means to outside vehicle environment. Optionally, the system is utilizing additional parameters like vehicle cabin
(Continued)

temperature and/or timing information about engine stop and driver leaving the car. Preferably, the system is using 60 GHz or 77-79 GHz integrated radar front end working in Doppler operation mode, with 4×4 Tx and Rx planar radiation elements, with physical size typically in the range 4×2×1 cm, or smaller.

21 Claims, 9 Drawing Sheets

(51) Int. Cl.
    *B60N 2/00*     (2006.01)
    *B60R 21/015*     (2006.01)
    *H01Q 1/22*     (2006.01)
    *H01Q 1/32*     (2006.01)
    *H01Q 9/28*     (2006.01)

(52) U.S. Cl.
    CPC ......... *H01Q 1/2283* (2013.01); *H01Q 1/3291* (2013.01); *H01Q 9/285* (2013.01)

(58) Field of Classification Search
    USPC .......................... 340/575, 457.1, 573.1, 457
    See application file for complete search history.

(56) References Cited

U.S. PATENT DOCUMENTS

| | | |
|---|---|---|
| 6,736,231 B2 | 5/2004 | Breed |
| 2003/0201894 A1 | 10/2003 | Li |
| 2005/0073424 A1 | 4/2005 | Ruoss |
| 2006/0273917 A1* | 12/2006 | Rams, Jr. ............... B60N 2/002 340/667 |
| 2007/0090938 A1* | 4/2007 | Donaldson ............ B60N 2/002 340/457 |
| 2007/0135984 A1 | 6/2007 | Breed |
| 2011/0074565 A1* | 3/2011 | Cuddihy ................ B60N 2/002 340/457 |
| 2012/0232749 A1* | 9/2012 | Schoenberg ........... B60N 2/002 701/36 |
| 2013/0194089 A1 | 8/2013 | Estrada |

* cited by examiner

Arrangement 1

Arrangement 2

Dipoles, arrangement and reflector

Chip connections without bond wires

Possible Sensor Module Functional Topology – Frontal view

Possible Sensor Module Functional Topology – Lateral view

MILLIMETRE-WAVE SEAT OCCUPATION RADAR SENSOR

TECHNICAL FIELD

The present invention relates to a seat occupation sensor and decision making device comprising mm-wave radar with planar high-gain antenna systems, utilizing information extracted from processing of both human heartbeat and breathing dynamics.

BACKGROUND ART

There is a strong motivation to deploy the smart seat occupation sensor in the following applications:
a) Detection of a human being on a seat.
b) Differentiation of the human being on the seat from the weight, potentially replacing seat pressure sensor commonly used in vehicles today.
c) Differentiation of the baby or child on a seat from the weight or adult.
d) Minimizing the loss of lives of babies or disabled persons left in a car on the sun.
e) Detection of the humans or animals in the vehicle areas.
f) Aftermarket seat occupation detection integration, i.e. deployment of the innovative apparatus in the vehicle cabin after the manufacturing of the vehicle is finished, which is not possible with the state-of-the-art solutions.

The primary motivation to address those problems is related to improving safety aspects by providing new features. Additionally, economic benefits will be introduced, e.g. by avoiding unnecessary air bag activation. Proposed technology offers an alternative to currently commonly used systems integrated in car seats with more features and with lower or same cost.

There is a need to enable differentiation between an object placed on a seat and the human being seating. Seat occupation is currently commonly detected by the pressure sensors integrated in the seat. Current solutions generally cannot easily differentiate between the child, adult, or object placed on a seat. This information may be used for safety belt alarm or air bag activation. Namely, airbag system may be switched on or off depending on whether there is a human or object on a seat. Furthermore, the airbag explosion could be adjusted depending on whether there is a child or an adult present. A child in a rear facing child seat, which is placed on the right front passenger seat, is in danger of being seriously injured if the passenger airbag deploys.

The health or even a life of a child or a disabled person left alone in the vehicle, either intentionally or inadvertently, can be endangered in case the temperature in the vehicle rises. The baby or child could suffocate due to the lack of oxygen in the cabin. On a typical summer day, the temperature inside a parked car can be up to 30° C. higher than the outside temperature. 75% of the temperature rise occurs within 5 minutes of closing the car and leaving it, 90% of the temperature rise occurs within 15 minutes. Dark colored vehicles reach slightly higher temperatures than lighter colored vehicles. The greater the area of glass in a car, the faster is the rise in temperature. Larger cars heat up just as fast as smaller cars. As the temperature rises, children begin to develop heat stress and also to dehydrate. Young children are more sensitive to heat than older children or adults and are at greater risk of heatstroke. There are the mortal cases on infants reported in real world. From 1998 to 2012 in USA, 559 child heatstroke deaths in vehicles, 288 (52 percent) happened after caretakers simply forgot they were there in car.

The state-of-the-art pressure sensors incorporated in the seat require a wired connection to the vehicle infrastructure. Hence, additional system integration efforts are required during manufacturing, in addition to the actual sensor cost. If the seats are not present in a vehicle, e.g. in case second or third row of seats was removed, there is no information about the presence of humans or animals. Ideally the information on human or animal presence should be available regardless of the seat infrastructure.

It was published in different scientific articles that microwave radar sensor, in the frequency range 3-30 GHz, may be used to detect the vital signs. Especially 2.4, 3-10, 24 and 60 GHz vital sign demonstrators have been publicly reported.

The following patents and patent applications published in last several years show the relevance of the topic and the state-of-the-art.

US 20120242492 A1, "Seat occupancy detection and display system", treats seat occupation by weight detection from sensors integrated in the seat, and further analysis by signal processing.

U.S. Pat. No. 8,115,648 B2, "Seat occupancy sensor", of IEE and BMW, proposes pressure sensing systems integrated in vehicle seats.

U.S. Pat. No. 6,026,340 A, "Automotive occupant sensor system and method of operation by sensor fusion", of Robert Bosch GmbH, proposes combined ultrasonic and infrared sensors for seat occupation detection.

WO 2013007540 A1, "Seat heater and capacitive occupancy sensor combination", of IEE, proposes the combination of seat heating system with capacitive sensors.

EP 2631113 A1, "Seat device and method for disposing seat occupancy sensor used therein", of Fijukura Ltd, treats specific pressure sensor arrangements.

DE 102011056522 A1, "Industrial truck i.e. forklift, has occupancy sensor and seat belt buckle sensor connected with control unit, where control unit is separate controller for monitoring correct usage of safety belt and separated from vehicle control system", of Unde Material Handling Gmbh, proposes sensor in safety belts as a means for seat occupancy detection.

WO 2011033360 A1, "Vehicle seat occupancy sensor", of Toyota, considers pressure sensor arrangements.

WO 2013092946 A1, "Occupancy sensor for occupiable item e.g. seat or bed", of IEE, introduces thermistor for heat based sensing.

DE 10131080 A1, "Optical seat occupancy sensor networks", of Daimler Chrysler Ag, introduces optical network for seat occupancy detection.

U.S. Pat. No. 8,013,727 B2, "Device for detecting vehicle seat occupancy", introduces electrical capacity sensors for seat occupancy.

U.S. Pat. No. 6,445,988 B1, "System for determining the occupancy state of a seat in a vehicle and controlling a component based thereon" relates to utilization of neural networks and different transducers.

U.S. Pat. No. 6,736,231 B2, "Vehicular occupant motion detection system using radar" introduces ultrasonic radar approach for determining seat occupancy by detecting the vital signs information. Its "radar" based system has two physically separated receivers of reflected ultrasound signals, and two units for further processing.

U.S. Pat. No. 6,104,293 A, "Warning system for detecting presence of a child in an infant seat" is based on warning to be issued by stopping the ignition of the car and intelligence in the infant seats.

DE 60125353 T2, "Seat occupancy recognition system" is utilizing safety belts as an occupancy sensor.

SUMMARY OF INVENTION

This invention proposed apparatus 100 and method of operation for seat occupancy detection, and initialization of the related actions, improving safety.

The key system relevant components of the proposed apparatus 100 are:
High-gain planar antenna system, realized by the plurality of the technologies, with each of the transmit 21 and receiving 22 parts having more than one antenna radiation element and the radiation diagram in the direction of the seat.
Millimeter-wave radar with integrated front end on silicon 10, System on Chip, providing analog processing of the mm-wave signal, and the provision of the analog to digital conversion functionality;
Digital signal processing functionality 40, having standardized automotive physical digital interface 60, with plurality of the realization;
Mechanical assembly with power supply interface to the vehicle power supply infrastructure, containing mechanically integrated antenna, digital and analog functionalities and having mechanical connection to the vehicle body.
Supporting circuitry 50 as a part of apparatus 100 may include functionalities like loudspeaker and light warning source, by the plurality of the realization options,
where apparatus is integrated in the vehicle chassis, facing passenger, with direct line-of-sight operation, where the method of operation includes:
Further in the system according to another aspect of the present invention, it is preferable that transmission of mm-wave signals generated in integrated mm-wave radio front end using high-gain planar antenna for transmitting mm-wave radio signals;
receiving mm-wave signals reflected from driver body using high-gain planar antenna for receiving mm-wave radio signals;
amplification of the reflected signal in integrated mm-wave radio front end;
down-conversion of the signals by mixing with the same signal of the same frequency as the transmitted signal in integrated mm-wave radio front end;
amplification of the converted signal after mixer in integrated mm-wave radio front end;
analog filtering of the signals after amplification in integrated mm-wave radio front end;
signal conditioning in integrated mm-wave radio front end for subsequent analog to digital conversion performed by analog to digital conversion entity;
digital processing of the signal in digital processing functionality, by:
extracting the heartbeat rate from the previous arbitrary processed signal;
digital processing in Seat occupation event decision functionality which includes the following steps:
evaluation if the heartbeat rate is within the specified range;
digital processing in seat occupation event calculation decision functionality is performed, which:
calculates the score by processing the information provided through entities of heartbeat rate evaluation, respiratory rate evaluation, rate of change of heartbeat rate evaluation, rate of change of respiratory rate evaluation, statistical heartbeat rate model, statistical respiratory rate model and time information weighted by the specified coefficients, where the score is related to the probability of the seat occupation event;
in case that the calculated score is above predefined threshold, decision on positive seat occupation event is made;
in case of the positive the seat occupation event the entity sends the decision information and the corresponding score to the entity of initiation of apparatus actions upon decided seat occupation;
in case of the positive the seat occupation event the entity of initiation of apparatus actions upon decided seat occupation initiates appropriate specified actions of the entity of automotive physical digital interface and/or entity of supporting circuitry,
where the seat occupation event denotes the presence of the human on the seat.

Further in the system according to another aspect of the present invention, it is preferable that apparatus and method of operation are incorporating digital processing of the signal in digital processing functionality which additionally includes statistical evaluation of the respiratory rate data history.

Further in the system according to another aspect of the present invention, it is preferable that appropriate specified action of the entity of automotive physical digital interface is initiating mechanical actions of the vehicle sub-systems.

Millimeter-wave front end preferably operates in 60 GHz ISM Band. The usage of the 77-79 GHz mm-wave frequency bands or higher mm-wave ISM bands is also proposed. The Rx and Tx antennas preferably have 4×4 elements, to explore the tradeoff between the size of the antenna, having impacts on the system cost and its integration in the vehicle environment, and obtaining the narrow antenna beam. The narrow antenna beam, associated with explicit high-gain antenna approach is essential part of the system, providing limited possibility that the biometric data, i.e. heartbeats or respirations, from the persons in the vicinity, but not on the seat. This is one of the essential innovative approaches, because it dramatically decreases the complexity of the digital processing, providing simple and low-cost apparatus. This is also an essential system-related factor, which imposes the use of mm-wave signals for seat occupation detection applications, as opposed to the state-of-the-art wireless technologies utilizing ultrasound system, such as U.S. Pat. No. 6,736,231.

Using mm-wave frequency band, preferably the 60 GHz ISM band, allows several important system related advantages compared to ultrasound approach proposed in U.S. Pat. No. 6,736,231:

Ultrasound wavelengths are very large compared to mm-wave ones, which imposes very complex signal processing with expensive hardware and significant computational effort, typically with neural networks and long training, must be performed. Typically at least two receiver parts must be involved to obtain the sufficient information for seat occupation detection, which are "arranged to determine the presence of a plurality of substantially the same motion which only in combination" may provide the detection of human being. Due to the nature of ultrasound, two receivers (RX) and transmitters (TX) must be separate and not a single device, mutually connected, and with performance is improved by increasing the separation between the receiver parts. Invention proposed here relates to simple device with single integrated Rx and TX part within the small micro module, with simple and straightforward signal processing. Moreover, the digital processing part is integrated within the same apparatus. On the other hand, integration of ultrasound hardware with electronics is quite difficult.

Inherently compact size, which enables easy integration into a single compact low-cost module, presents a significant system advantage, hence almost eliminating practical use of the system proposed in U.S. Pat. No. 6,736,231.

It would be very difficult for the system proposed in U.S. Pat. No. 6,736,231 to operate in the realistic scenario, with each of the seats monitored with a separate TX and a pair of RX parts. The TX part of one seat would interact with RX parts of other seats. Thus, they could work only if they are coordinated, meaning that central vehicle system activates seat detection for one seat at a time, which increases the system handling dramatically. Otherwise, the signal processing would be even more complex and would require much more resources. Proposed innovative system may work independently and simultaneously, with frequency reuse for all sensors due to the high directivity of the RX and TX antenna.

Due to the propagation of the ultrasound, it is very likely that the system proposed in U.S. Pat. No. 6,736,231 would "pick-up" vital signals from persons from neighboring seats. To overcome this problem, huge processing efforts are needed. Our proposed system can be easily used due to the narrow beam radiation pattern "looking" only at a single seat.

The proposed approach of U.S. Pat. No. 6,736,231 has a system drawback of difficult deployment in the aftermarket mode, requiring a lot of installation efforts, especially for integrating hardware in the vehicle cabin environment, in contrast to proposed approach where a compact module of 4×2×1 cm may be utilized, potentially without any connection to the vehicle infrastructure. Due to relaxed processing requirements, only small digital hardware is required, providing low-power operation and low dissipation.

Unlike the ultrasound, mm-wave frequency band signals do not penetrate the human skin.

Present invention has innovative approach of integrating complete RF functionalities of the mm-wave radar (30-300 GHz) within a system-on-chip, including complete mm-wave frequency synthesis, fabricated in standard silicon process. Digital signal processing is using single digital processing HW for simultaneous processing of both heartbeat and respiratory signals.

The proposed system analyses both heartbeat and breathing simultaneously, thereby dramatically increasing the accuracy of seat occupation detection and decreasing the probability of the false alarm. Only the heartbeat analysis may be considered as sufficient for some seat occupation detection applications in order to reduce the system complexity.

The proposed apparatus has significant advantages compared to the state-of-the-art, in at least one of the following features:

There is no physical contact to the human body or clothes.

The system functions independently of the light condition in the vehicle cabin.

The system is inherently low-cost allowing the complete HW solution in the range less than 10$ for large quantities.

The system is compact with inherently small thickness of typically less than 1 cm, allowing easy integration, which reduces assembly cost in the vehicle manufacturing, and allows aftermarket deployment.

The system can analyze two essential biomarkers simultaneously, heartbeat and respiratory dynamics, and therefore has increased accuracy in seat occupation detection, i.e. small probability of the false alarm.

The proposed system may function with several meters distance between the human and the apparatus, depending on the antenna arrangement, transmit power, and receiver sensitivity. The transmit power is, however, reduced to the minimum needed, for the reasons of having minimum power consumption, minimal thermal dissipation, and minimum reflection clutters, which will further simplify digital processing algorithms and further reduce the power consumption and thermal dissipation. The digital part typically includes CAN and/or LIN interface allowing easy connection to the vehicle infrastructure. The means of short range wireless connection to the vehicle system 63 is optional and suited for the aftermarket usage. In aftermarket mode the proposed apparatus may have integrated audio and/or visual indicators.

Apparatus 100 could be also realized with one high gain planar antenna and isolator functionality. This may reduce the size of the system but in the same time increase the technical requirements on isolator functionality, which is difficult to release in the low cost and miniature manner.

Instead of the down conversion mixer in the integrated mm-wave chip functionality 10, the IQ demodulator may be integrated, providing some extra features in the digital signal processing.

DESCRIPTION OF EMBODIMENTS

Figure 1:
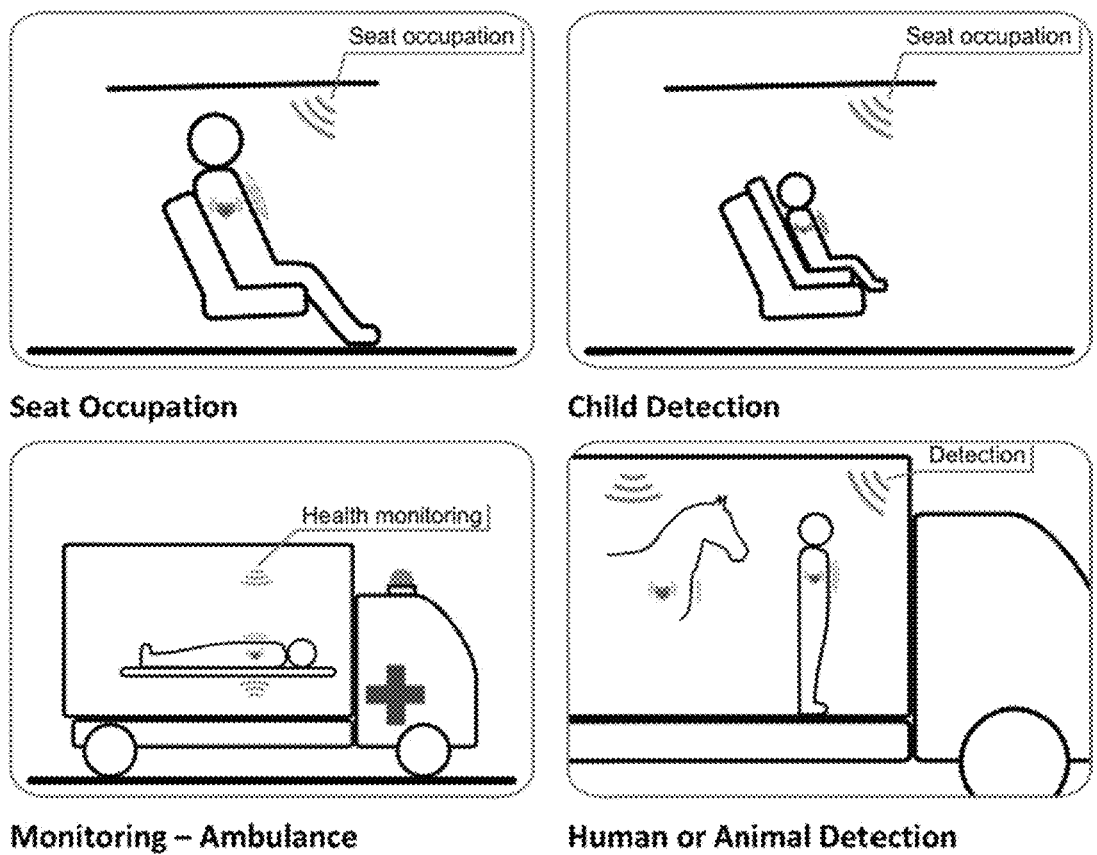
FIG. 1 presents apparatus in the vehicle environment—application scenarios
Figure 2:
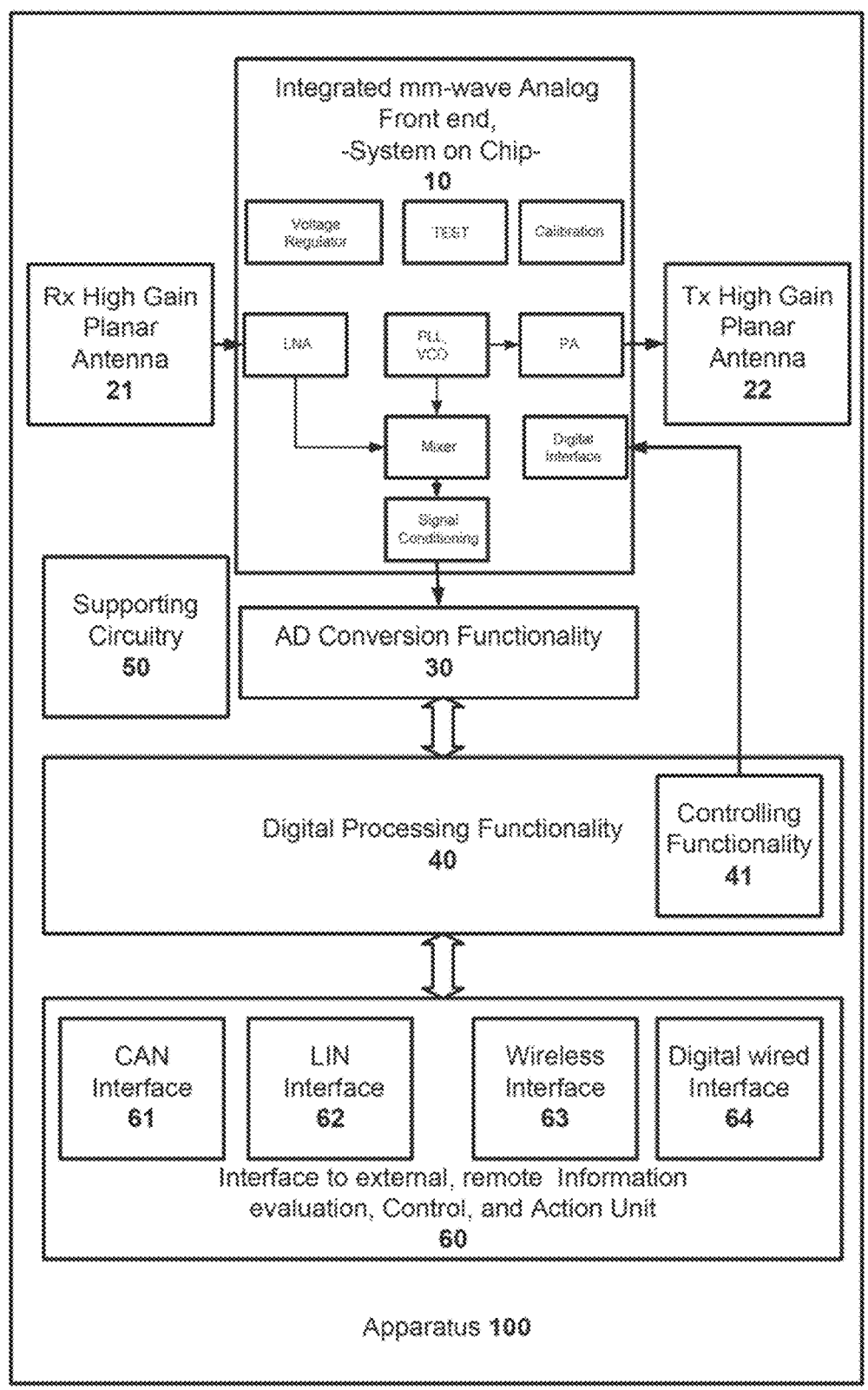
FIG. 2 presents apparatus functional block diagram

Apparatus 100 is preferably integrated in the vehicle, having Line-of-Sight (LOS), i.e. no obstacles, between the system and the human body, as shown in the FIG. 1. Some application scenarios are also illustrated in FIG. 1. Due to advantageously proposed mm-wave radar application, the size of the high-gain Antenna System for RX 21 and for TX 22 is small enough to allow practical use of the apparatus in the vehicle cabin while maintaining high-gain antenna features. Taking into account proposed 60 GHz ISM band operation, or alternatively 77-79 GHz operation, and 4×4 antenna elements for 21 and 22, the approximate size of the device may be less than 4×2×1 cm, which would inherently allow practical use in vehicle cabins.

Figure 4:
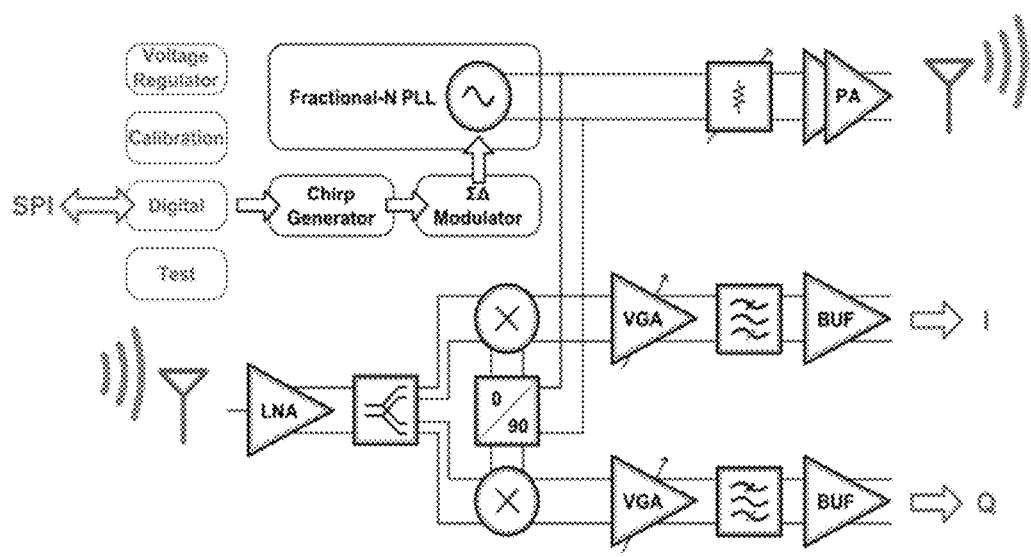
FIG. 4 presents integrated mm-wave front end block diagram

The crucial block of the proposed apparatus 100 is the Integrated mm-wave front end,—System on Chip—10. It contains the complete RF functionality, and includes power amplifier functionality attached to the antenna system 22, low noise amplifier attached to antenna system 21, integrated PLL, used both for up-conversion in transmit and down-conversion in receive, one analog pre filtered an amplified signal or providing two analog pre-filtered and amplified signals as IQ outputs to A/D conversion functionality 30. The entity 10 has test functionality, voltage regulation, and digital interface to the Controlling functionality 41, which is a part of the Digital Processing functionality 40. More detailed structure of the integrated front end 10 is given in FIG. 4, with IQ outputs. The realization with one down conversion mixer and one signal conditioning part compromising amplification and filtering, would require less space in the entity 10 and therefore less cost. The use of the integrated front end 10 allows the system to be compact and have low-cost assembly, enabling the use in the real product. Integration of the complete frequency synthesis and complete analog functionality in a single chip allows considerable reduction of the cost, which is not the case in published mm-wave systems. The entity 10 is preferably realized using SiGe BiCMOS technology that provides high performance. Alternatively CMOS technology may be used. AD (analog to digital) conversion functionality 30 converts the analog conditioned signal or two quadrature signals, I and Q, of the entity 10, and feeds digital representation of signal or signals to the Digital processing functionality 40 for further processing. Entity 30 is realized by plurality of the realization options, with sampling frequency typically under 1 MHz and typically at least 8 bit resolution for the vital signs detection applications. Entity 30 may be integrated on the same chip as Entity 10. Entity 30 may be integrated on the same chip as Entity 40. Entities 40, 10, and 30 may be all integrated on a single chip. Entity 60 is providing interface to vehicle infrastructure by using typical vehicle wired interfaces like CAN interface 61, and/or UN interface 62, optional custom digital interface 64, and optional short range wireless interface 63. Standard interface, preferably CAN, is obligatory for all applications where the apparatus is integrated in vehicle during manufacturing. For aftermarket applications the short range wireless interface, preferable Bluetooth, may be integrated in entity 60. Supporting circuitry 50 optionally includes additional memory, manual switching, power supply regulation circuitry, mechanical support, and any additional functionality required for easy integration, during manufacturing or later in aftermarket. The mechanical support structure for integration of all functionality is preferably provided using advanced polymer technologies. Optionally, in case of the aftermarket operation, entity 50 may also include battery, loudspeaker or warning light sources, allowing autonomous operation.

Figure 3:
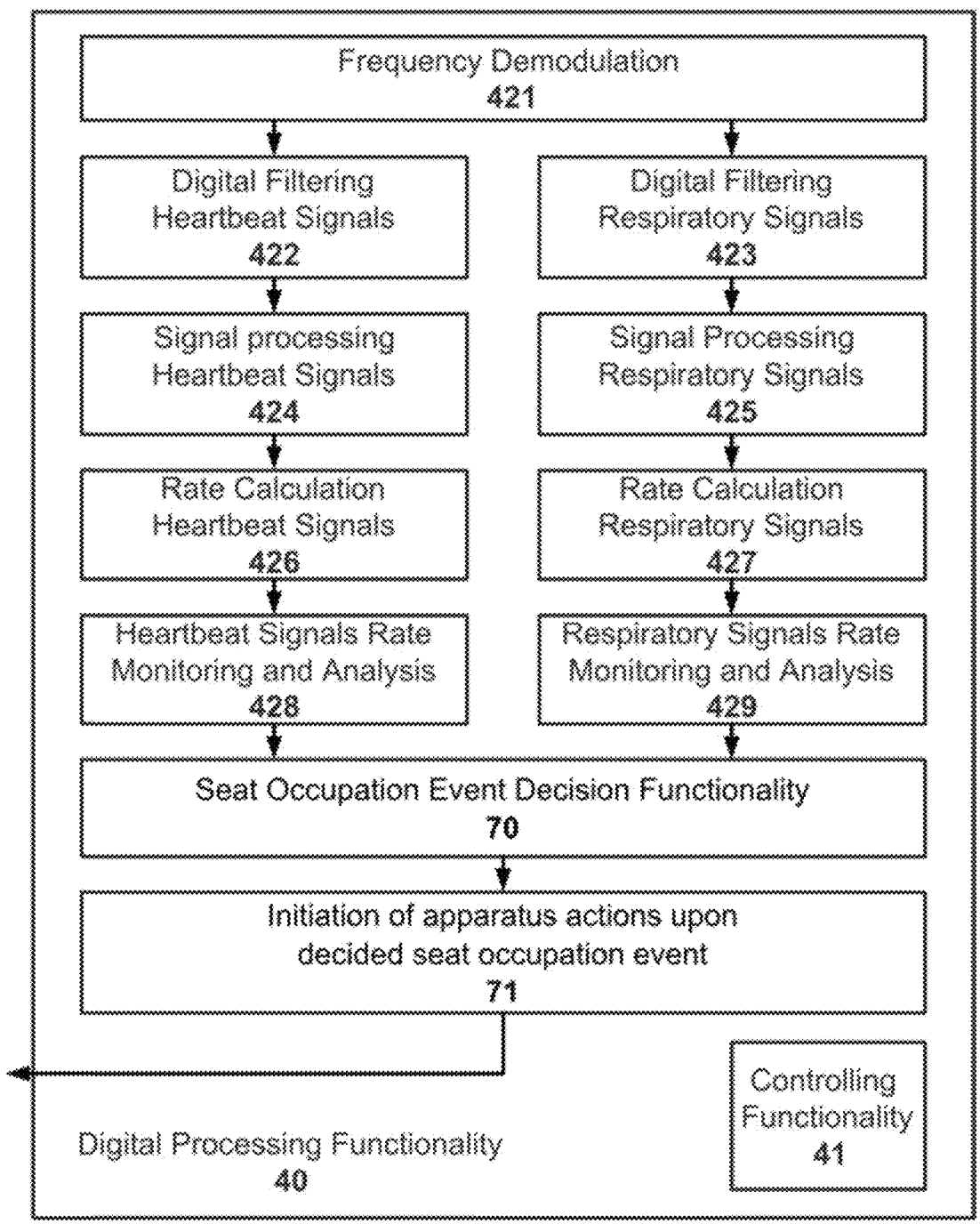
FIG. 3 presents apparatus digital processing functional blocks

Digital processing functionality 40 may be realized by the plurality of technologies, such as: advanced CPUs, FPGAs, advanced µC, DSP, or ASIC, or their combinations, where the digital processing may be performed by "soft" approach or by hard-wired approach or by their combination. Preferably functionalities 60 and 40 are integrated on a simple ASIC, having CPU on one digital SOC. Digital processing functionality 40 includes functionalities 41, 421-429 and 70-71 as described in FIG. 3. The goal is to perform remote and contactless detection of the body movement. Important information is the micro-movement of the body; therefore, the simplest approach like Doppler radar system may be used. The entity 10 sends mm-wave CW signal by Tx antenna entity 22 towards the body. The radio signal of mm-wave frequency does not penetrate the clothes and the human body. Heartbeat and respirations cause body micromovements. According to Doppler effect those signal are causing frequency modulation of the radio signal received by the antenna entity 21. After the IQ demodulation, i.e. mixing with the quadrature of the transmitted signal, and subsequent low-pass filtering, performed in the entity 10, the low-frequency baseband signals are provided to the entity 30. These two analog signals are converted into corresponding two digital streams by the entity 30 and fed into the entity 40. In entity 421 additional low-pass digital filtering may be performed. Data is further provided to entities 422 and optional 423, which perform appropriate digital band-pass filtering such that the expected heartbeat and respiratory rates are in-band. Filter characteristics must account for the expected variations of the appropriate biomarkers which reflect normal and fatigue conditions. Filtering characteristics may be set based on the biomarkers history and statistics, previously stored in memory. Entities 426 and optional 427 perform the heartbeat and respirations rates respectively. Filtered signals are first converted in the frequency domain. The corresponding heartbeat and respiratory rates are detected as peaks in signal spectrum. The position of the peaks determines the corresponding rate. The plurality of peak detection methods may be utilized, with corresponding digital signal processing realizations of various averaging, smoothing, windowing and peak position estimation techniques. In optional entities 428 and 429, the calculated rates are further processed by calculating the rate of the change of the heartbeat and respiratory rates, which may be mathematically expressed as derivatives of the corresponding biometric rates, where various averaging techniques may be applied. This information is provided to the entity 70, which is responsible for seat occupation event detection, regarding different application scenarios. In entities 711 and optional 712 respective rates are compared with the set of previously detected values, or predefined thresholds, which are provided by optional entities 715 and 716. All information is provided to the entity 720. Optional entities 715 and 716 are updated with the new rates and optional corresponding rates of change. Optional entities 715 and 716 can contain the history of the biomarkers information, particularly including:

Rate information in specific predefined time steps;
Averaged information of rate over at least one predefined period;
Rate of change information in specific predefined time steps;
Averaged information of rate of change over at least one predefined period;
Comparison thresholds for rate related to adult, baby and child with specific statistics and probability;
Compassion thresholds for rate of change.
Comparison thresholds may be predefined or statistically calculated based on the stored data.

Time information entity 717 is providing optional additional information to entity 720 including:
time information on the vehicle engine being on or off;
current local time information.

Optional entity 719 is providing information form the external cabin gas sensor to entity 720, preferably including $CO_2$ concentration. Optional entity 718 provides information of the vehicle cabin temperature to entity 720. This information may be provided from external sensors embedded in vehicle provided to apparatus 100 through entity 60.

Seat occupation event calculation entity 720 calculates seat occupation score based on a weighted sum of the following information set, with possible zero weights in case corresponding optional blocks are not present:
Heartbeat rate existing;
Heartbeat rate existing in predefined thresholds detecting adult;
Heartbeat rate existing in predefined thresholds detecting child;
Heartbeat rate existing in predefined thresholds detecting baby;
Rate of change of the heartbeat rate achieved calculated or predefined threshold for baby;
Respiratory rate existing;
Respiratory rate existing in predefined thresholds detecting adult;
Respiratory rate existing in predefined thresholds detecting child;
Respiratory rate existing in predefined thresholds detecting baby;
Rate of change of the respiratory rate achieved calculated or predefined threshold for baby;
Time duration since engine was stopped;
Vehicle cabin temperature;
$CO_2$ concentration achieved specific predefined threshold;
Part of the day: early morning, daytime, twilight, night, late night.

The weighting factors are predefined or determined based on the information set, predefined values and behavior statistics. If the score is above the threshold, the different seat occupation events are detected. Based on the score value, the seat occupation events are determined. This information is communicated to the entity 71. Based on this information, the entity 71 is initiating predefined actions using entity 60 and/or entity 50 where optional audio and optional visual indication/alerting capabilities are included.

Predefined seat occupation events are:
1. Decision: Seat is occupied by person
   a. Cause:
      Detected heartbeat.
   b. Possible action:
      Provide the information to the vehicle infrastructure so it can influence safety belt alarming and airbag activation.
2. Decision: Seat is occupied by a baby or a child
   a. Cause:
      Detected heartbeat rate value is within the specified range for a baby or a child;
      Optionally detected respiratory rate value is within the specified range for a baby or a child.
   b. Possible action:
      Provide the information to the vehicle infrastructure so it can influence safety belt alarming, airbag activation, and the control of the airbag explosion.
3. Decision: A baby or a child is left in car
   a. Cause:
      Detected heartbeat rate value is within the specified range for a baby or a child;
      Optionally detected respiratory rate value is within the specified range for a baby or a child;
      Engine stopped and the specified time elapsed since;
      Optionally other adult left the vehicle;
      Optionally driver left the vehicle;
      Optionally the temperature in cabin is raised;
      Optionally heartbeat rate of a baby or a child changed;
      Optionally respiratory rate of a baby or a child changed.
   b. Possible action:
      Provide the information to the vehicle infrastructure so it can initiate audio and/or visual alarms, optionally open the windows, optionally request driver's confirmation, optionally send emergency alarm through e-call;
      Activate the audio and/or video alarm system of apparatus 100 if existing.
4. Decision: Monitored vital signs, i.e. heartbeat and optionally respirations, of a person exhibit abnormal behavior
   a. Cause:
      Monitored heartbeat rate is not within the predefined range;
      Optionally monitored respiratory is not within the predefined range;
      Optionally, the rate of change of the heartbeat rate is not within the predefined range;
      Optionally, rate of change of the respiratory rate is not within the predefined range.
   b. Possible action:
      Inform vehicle or other monitoring system to issue specific predefined alarm, and/or initiate emergency action.
5. Decision: Person or animal left the observing area or died
   a. Cause:
      Monitored heartbeat stopped in the observing area;
      Optionally monitored respirations stopped in the observing area.
   b. Possible action:
      Inform vehicle or other monitoring system to issue specific predefined alarm, and/or initiate emergency action.

If the apparatus detects the abrupt stop of the heartbeat confirmed with the cease of respiratory activity, alerts to the driver are initiated. In case the driver does not respond, emergency condition is confirmed and emergency actions are initiated. Emergency actions may include appropriate engine and brake systems control, and/or emergency calls.

Figure 5:
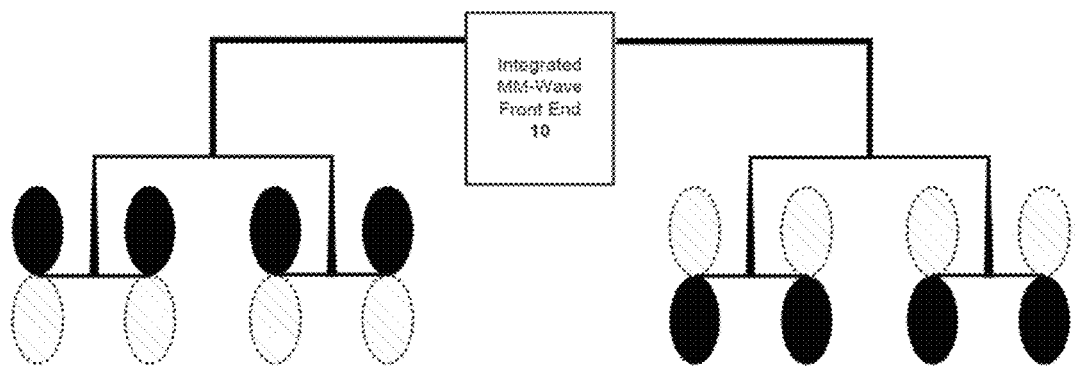
FIG. 5 presents antenna RX and TX system options with 4 and 8 dipoles
Figure 5:
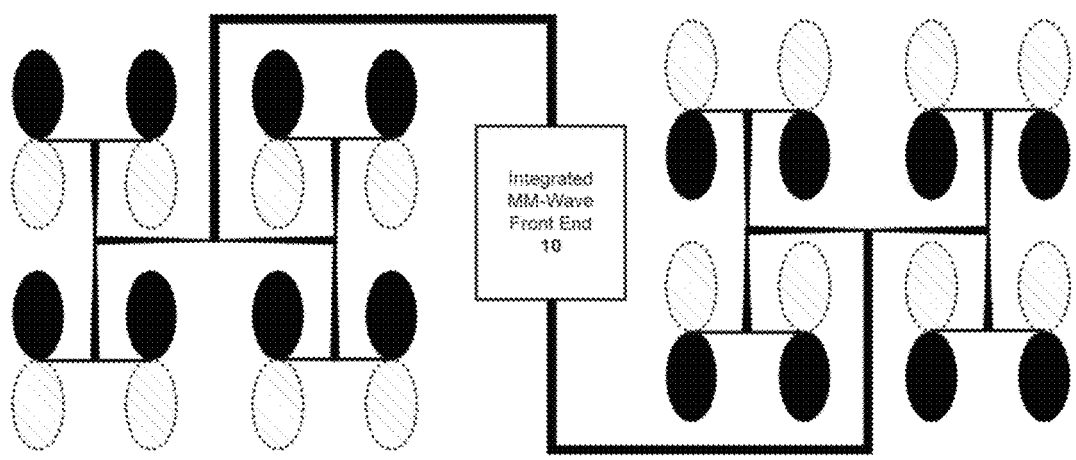
Figure 6:
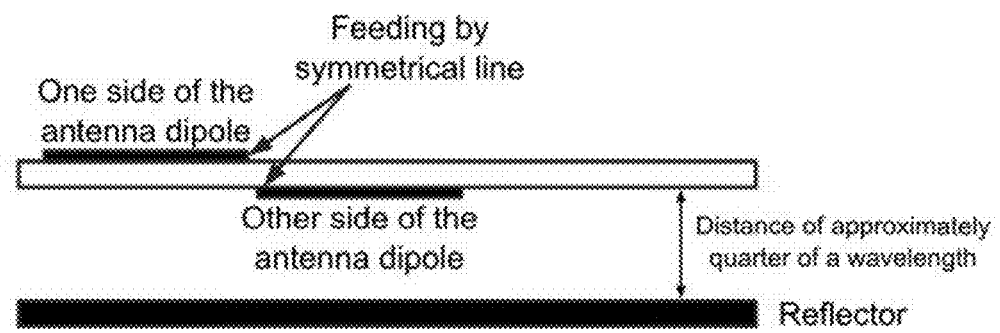
FIG. 6 presents antenna element arrangement and chip connection to the antenna feeding arrangement
Figure 6:
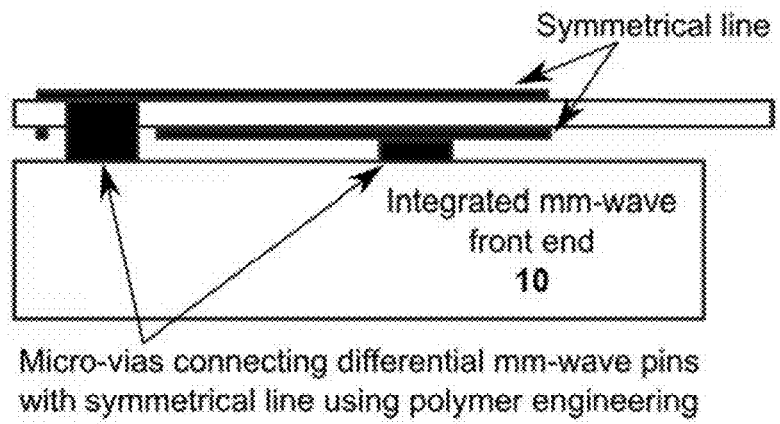
Figure 7:
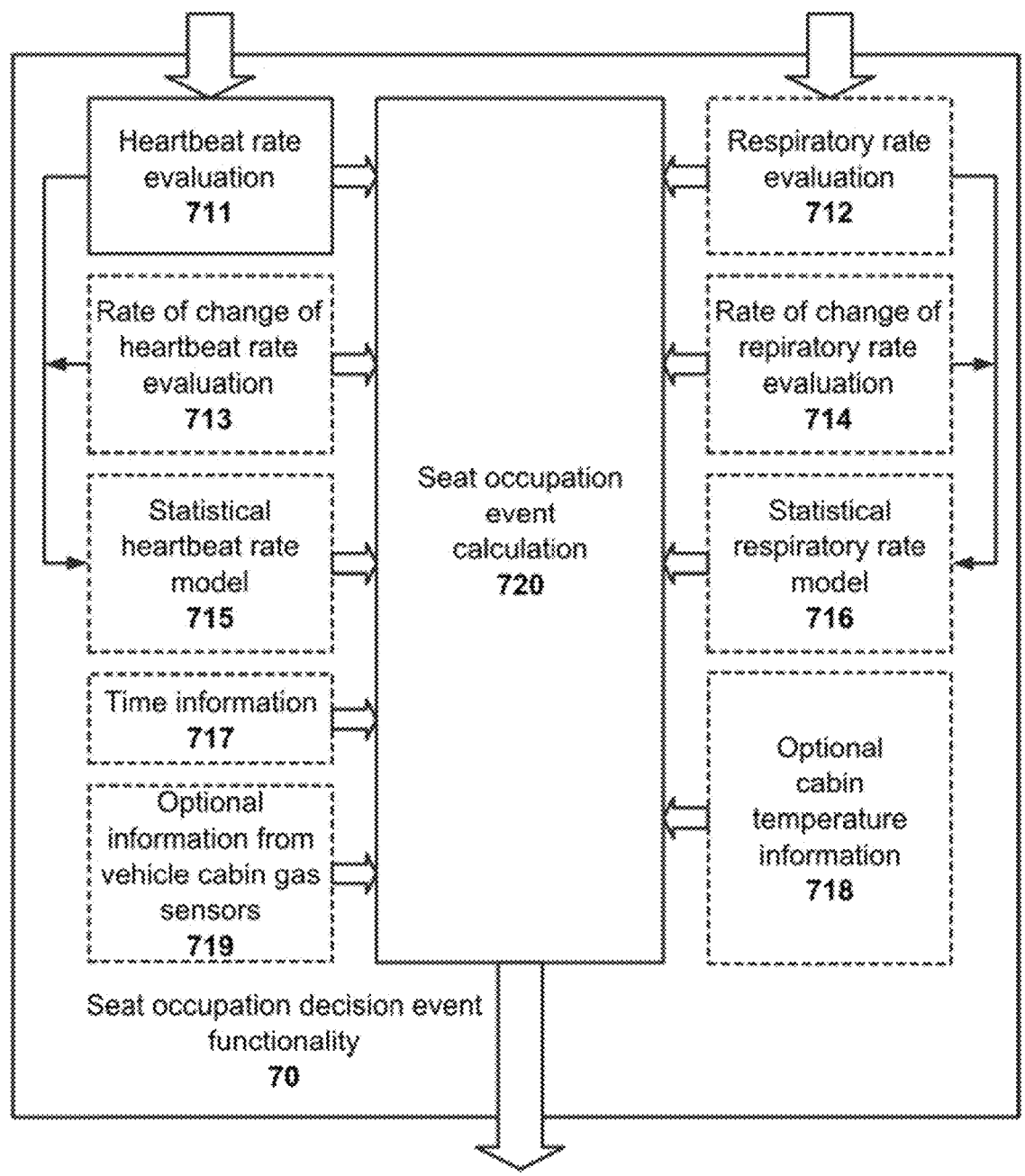
FIG. 7 presents seat occupation detection functional block
Figure 8:
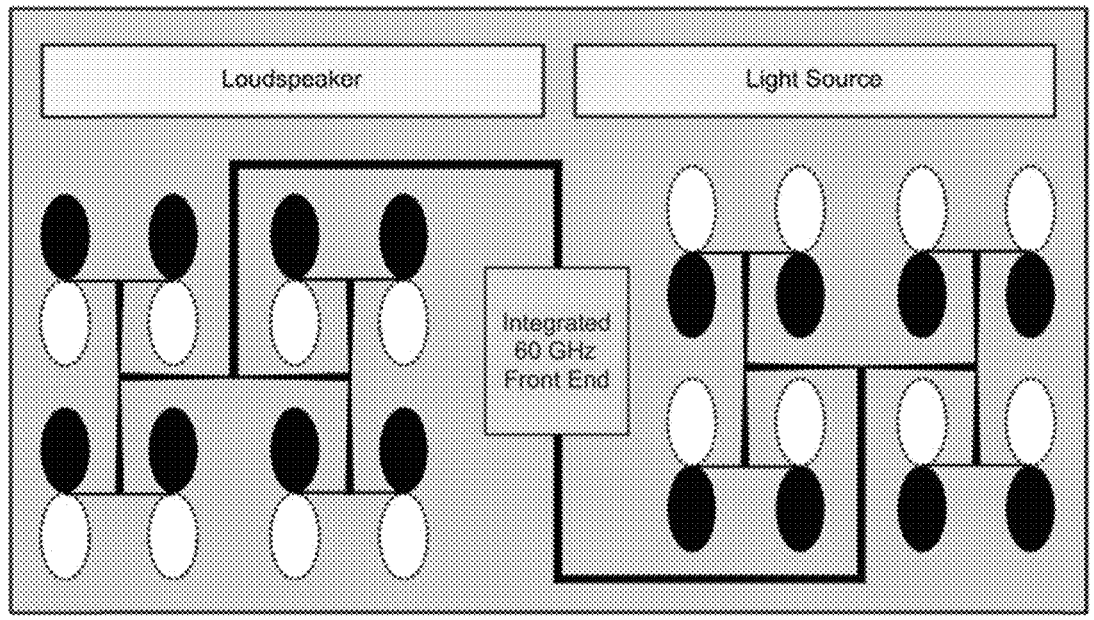
FIG. 8 presents preferable integrated module 3D topology based on apparatus 100, top and lateral view, with polymer integration approach FIG. 9a) presents apparatus functional block diagram with one high gain antenna for both transmitting and receiving mm-wave radio signals, isolator functionality and single mixer in mm-wave chip functionality 10
Figure 8:
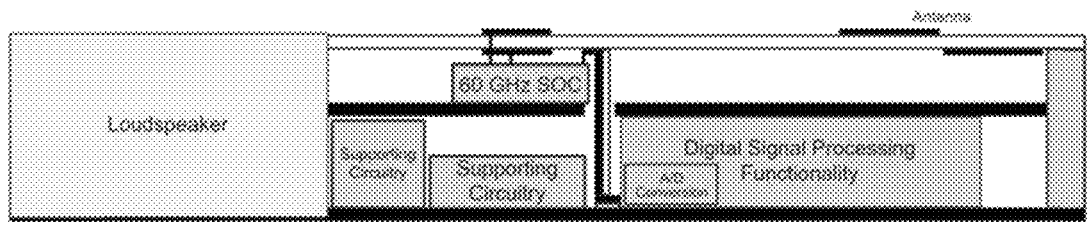

In FIG. 5 two antenna high-gain arrangements are shown. Systems 21 and 22 are on the left and right side of the integrated front end entity 10. The arrangement 2 may be considered as the preferred embodiment, providing preferable tradeoff in size and performance, having the front size dimensions of the complete apparatus 100 of 4×2 cm or less for the 60 GHz ISM band operation. The antenna system is preferably realized as the planar printed dipoles with ellipsoid-like antenna shapes, with the two parts printed on opposite sides of the dielectric layer, which also provides mechanical support. Prints on the opposite side of the dielectric are depicted using dashed lines on FIG. 5. Cross section presented in FIG. 6 shows antenna printed on the opposite sides of the dielectric layer, as well as metalized reflector at the distance of approximately one quarter of wavelength. The space between the reflector and the antenna may be empty or filled with foam. The antenna parts 21 and 22 are fed by the symmetrical lines printed on both sides of the dielectric approaching dipoles perpendicularly to their arrangement, as shown in FIG. 5. Symmetrical strip line may be advantageously connected to differential mm-wave inputs and outputs of the entity 10 by using micro-vias produced by an advanced polymer technology. This is illustrated in of FIG. 6.

Supporting circuitry 50 as a part of the apparatus 100 may include loudspeaker and/or light source functionality having plurality of possible realizations. This feature would allow apparatus 100 to be independent of the vehicle infrastructure by initializing appropriate audio and/or visual warnings and/or indications. These options are useful for all types of the aftermarket applications, where the apparatus 100 is assembled in vehicles after production.

Figure 9:
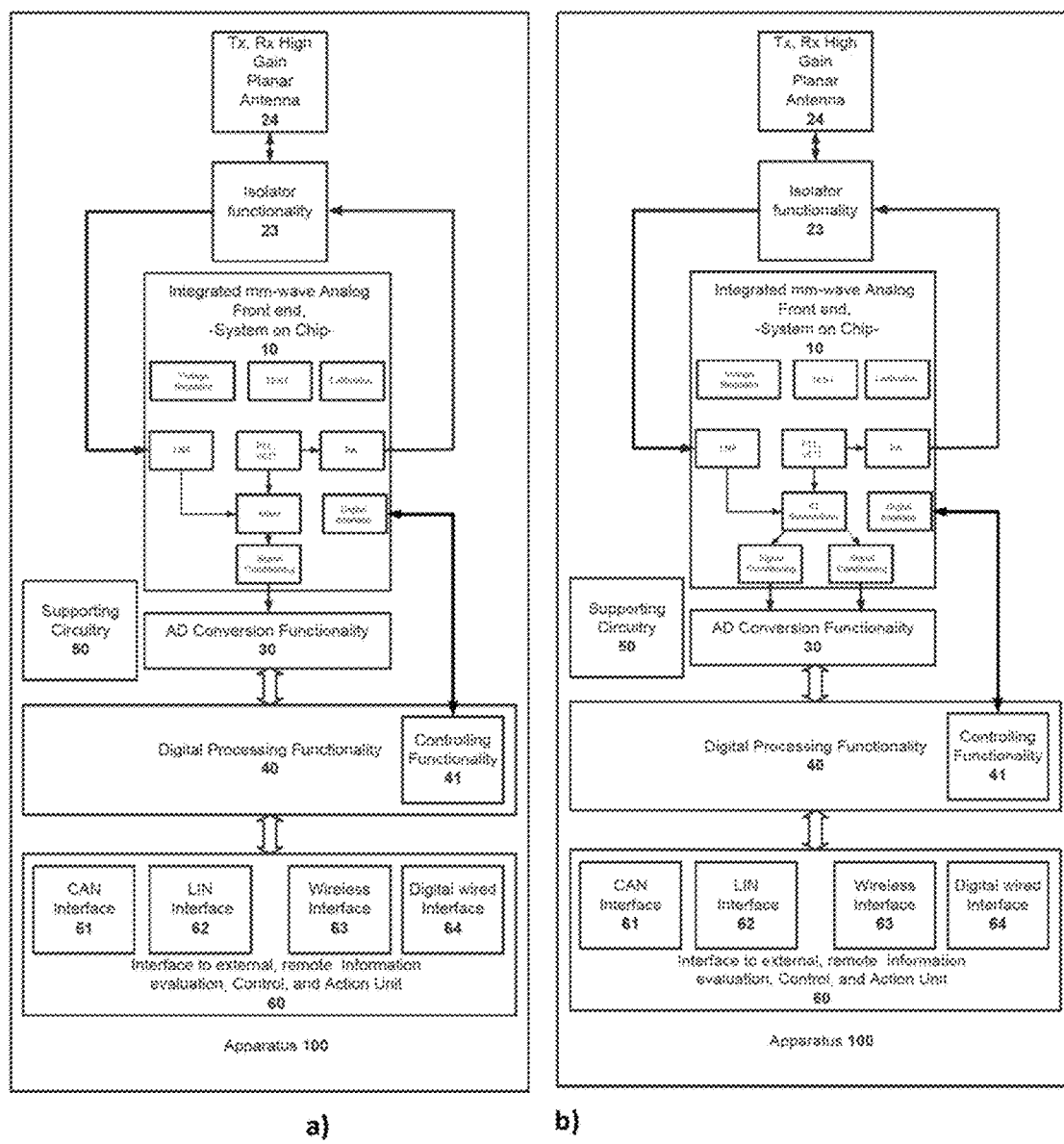
FIG. 9b) presents apparatus functional block diagram with one high gain antenna for both transmitting and receiving mm-wave radio signals, isolator functionality and IQ demodulator in mm-wave chip functionality 10

Alternatively instead of using two high gain antennas one for Tx 22 and one for Rx 21, the proposed system may be realized by one high gain antenna for both Rx and Tx functionality, 24 like in FIG. 9a) and FIG. 9b) and isolator functionality 23. This approach has several system disadvantages of the difficult practical realization of the entity 23 providing sufficient isolation between Rx and TX inputs of the entity 10. Also entity 23 inherently includes unwanted signal attenuation of the TX signal toward antenna and received signal from antenna toward the RX input of the entity 10. This imposes more power consumption of the system, more thermal dissipation, and more system cost on isolator entity 23 realization. Entity 23 could be preferably realized by rat race planner coupler structures, also on the IC level within the entity 10 or on the PCB level, where the entity 10 is assembled in the Apparatus 100. The only potential system related sensor advantage would be the reduced size of the apparatus 100, where the one planar high gain antenna would need to be integrated instead of two.

The usage of the IQ demodulator instead of signal mixer in entity 10, would provide the two analog baseband down converted quadrature signals to the entity 30. Having two signals in the signal processing path additional information about phase changes between two signal may be used. This may increase the accuracy in the digital signal processing and some redundancy, by the expense of the more chip size of entity 10 and more processing efforts of the entity 40. The method of operation may use the straight forward information obtained from the one down conversion chain from I or from Q chain, and do not process the information from other chain, as long there is no need in more accurate information extraction. The existence of the both chains, with 90 degrees moved zero crossings, may have practical advantages. By evaluating the phase changes of the IQ signals, with the typical accuracy of 1-2 degrees resolution, micro movements of the objects may be evaluated with more accuracy, within one wave length typically in μm region. This may increase the capability of the frequency extraction.

The invention claimed is:

1. MM-wave Seat Occupation Sensor Apparatus and method of operation, where mm-wave declares operation between 30 and 300 GHz, is including:
   high-gain planar antenna for transmitting mm-wave radio signals, where the high-gain planar antenna has at least two radiation elements;
   high-gain planar antenna for receiving mm-wave radio signals, where the high-gain planar antenna has at least two radiation elements;
   integrated mm-wave radio front end, implemented in arbitrary semiconductor technology, having on-chip integrated mm-wave voltage control oscillator, mm-wave power amplifier, mm-wave low noise amplifier, mm-wave down conversion mixer, digital control interface, power supply; and PILL
   analog to digital conversion entity;
   digital processing functionality including controlling functionality and calculation and memory capacity for performing digital signal processing by arbitrary type of the realization options;
   interface to vehicle infrastructure, including one or more standardized automotive wired interfaces;
   supporting circuitry, including mechanical interface to vehicle infrastructure and supporting electronic circuitry for power supply of,
where apparatus is integrated in a vehicle chassis, facing passenger, with direct line-of-sight operation, where the method of operation includes:
   transmission of mm-wave signals generated in integrated mm-wave radio front end using high-gain planar antenna for transmitting mm-wave radio signals;
   receiving mm-wave signals reflected from driver body using high-gain planar antenna for receiving mm-wave radio signals;
   amplification of a reflected signal in integrated mm-wave radio front end;
   down-conversion of the signals by mixing with the same signal of the same frequency as the transmitted signal in integrated mm-wave radio front end;
   amplification of the converted signal after mixer in integrated mm-wave radio front end;
   analog filtering of a signals after amplification in integrated mm-wave radio front end;
   signal conditioning in integrated mm-wave radio front end for subsequent analog to digital conversion performed by analog to digital conversion entity;
   digital processing of the signal in digital processing functionality, by:
   extracting a heartbeat rate from the previous arbitrary processed signal;
   digital processing in Seat occupation event decision functionality which includes the following steps:
      evaluation if the heartbeat rate is within the specified range;
      digital processing in seat occupation event calculation decision functionality is performed, which:
      calculates a score by processing the information provided through entities of heartbeat rate evaluation, respiratory rate evaluation, rate of change of heartbeat rate evaluation, rate of change of respiratory rate evaluation, statistical heartbeat rate model, statistical respiratory rate mode and time information weighted by a specified coefficients, where the score is related to the probability of a seat occupation event;
      in case that the calculated score is above predefined threshold, decision on positive seat occupation event is made;
      in case of the positive the seat occupation event the entity sends a decision information and the corresponding score to the entity of initiation of apparatus actions upon decided seat occupation;
      in case of the positive the seat occupation event the entity of initiation of apparatus actions upon decided seat occupation initiates appropriate specified actions of the entity of automotive physical digital interface and/or entity of supporting circuitry, where the seat occupation event denotes the presence of a human on the seat.

2. System according to claim 1, in which apparatus and method of operation are incorporating:
digital processing of the signal in digital processing functionality which additionally includes extraction of the rate of change of the heartbeat rate from the previous arbitrary processed signal;
evaluation if the rate of change of the heartbeat rate is within specified range.

3. System according to claim 2, in which apparatus and method of operation are incorporating:
digital processing of the signal in digital processing functionality which additionally includes statistical evaluation of the rate of change of a heartbeat rate data history.

4. System according to claim 1, in which apparatus and method of operation are incorporating:
digital processing of the signal in digital processing functionality which additionally includes extraction of a respiratory rate from the previous arbitrary processed signal;
evaluation if the respiratory rate is within a specified range.

5. System according to claim 4, in which apparatus and method of operation are incorporating:
digital processing of the signal in digital processing functionality which additionally includes extraction of the rate of change of the respiratory rate from the previous arbitrary processed signal;
evaluation if the rate of change of the respiratory rate is within specified range.

6. System according to claim 5, in which apparatus and method of operation are incorporating:
digital processing of the signal in digital processing functionality which additionally includes statistical evaluation of the rate of change of a respiratory rate data history.

7. System according to claim 4, in which apparatus and method of operation are incorporating;
digital processing of the signal in digital processing functionality which additionally includes statistical evaluation of a respiratory rate data history.

8. System according to claim 1, in which apparatus and method of operation are incorporating:
digital processing of the signal in digital processing functionality which additionally includes statistical evaluation of a heartbeat rate data history.

9. System according to claim 1, in which entity of optional cabin temperature information provides information about a vehicle cabin temperature to entity of seat occupation decision event functionality, and where this information influences seat occupation event score calculation in method of operation.

10. System according to claim 1, in which entity of time information provides information on time elapsed since the engine stopped entity of seat occupation decision event functionality, and where this information influences seat occupation event score calculation in method of operation.

11. System according to claim 1, in which optional information from vehicle cabin gas sensor is provided to entity of seat occupation decision event functionality, and where this information influences seat occupation event score calculation in method of operation, in case that increased $CO_2$ concentration is detected.

12. System according to claim 1, in which the supporting circuitry contains audio and/or visual alerting and/or indication capabilities of arbitrary realization, which are activated in case the seat occupation event is detected by the entity of initiation of apparatus actions upon decided seat occupation event.

13. System according to claim 1, where the seat occupation event is the presence of a baby on the seat.

14. System according to claim 1, where the seat occupation event is the presence of a baby on the seat after a driver has left a car.

15. System according to claim 1, where the seat occupation event is the presence of a human in dedicated vehicle area.

16. System according to claim 1, where the seat occupation event is the presence of an animal in dedicated vehicle area.

17. System according to claim 1, where appropriate specified action of the entity of automotive physical digital interface and/or entity of the supporting circuitry is activating audio alarm.

18. System according to claim 1, where appropriate specified action of the entity of automotive physical digital interface and/or entity of the supporting circuitry is activating visual alarm.

19. System according to claim 1, where appropriate specified action of the entity of automotive physical digital interface is initiating mechanical actions of a vehicle subsystems.

20. System according to claim 1, in which the sensor apparatus and method of operation has only one high gain antenna for transmitting and receiving mm-wave radio signals, where the high-gain planar antenna has at least two radiation elements and isolator functionality being released by plurality of the realization option, providing isolation between Rx and Tx chains, and related Rx and Tx connection to high gain antenna.

21. System according to claim 1, in which the sensor apparatus and method of operation has entity of integrated mm-wave radio front end having instead of mm-wave down conversion mixer, an IQ Demodulator, and two signal conditioning chains instead of one.

* * * * *